United States Patent [19]

Feistel

[11] Patent Number: 5,347,915
[45] Date of Patent: Sep. 20, 1994

[54] PISTON COMPRESSOR FOR THE OILFREE COMPRESSION OF GASES

[75] Inventor: Norbert Feistel, Winterthur, Switzerland

[73] Assignee: Maschinenfabrik Sulzer-Burckhardt AG, Basle, Switzerland

[21] Appl. No.: 954,443

[22] Filed: Sep. 30, 1992

[30] Foreign Application Priority Data

Nov. 6, 1991 [CH] Switzerland .................. 03237/91-5

[51] Int. Cl.⁵ .............................. F16J 1/00; F16J 9/00
[52] U.S. Cl. ........................................ 92/258; 92/241; 92/249; 92/192; 277/170; 277/188 R; 277/71
[58] Field of Search ................. 92/255, 257, 258, 248, 92/249, 240, 241, 192, 247; 277/170, 171, 174, 177, 188 R, 188 A, 71, 78, 79

[56] References Cited

U.S. PATENT DOCUMENTS

| | | | |
|---|---|---|---|
| 1,779,837 | 10/1920 | Batty . | |
| 2,294,519 | 9/1942 | Starr | 92/257 |
| 2,799,523 | 7/1957 | Parker | 277/71 |
| 2,948,554 | 8/1960 | Mahand | 277/71 |
| 3,023,014 | 2/1962 | Donner | 277/78 |
| 3,353,832 | 11/1967 | Coulson | 277/171 |
| 3,971,298 | 7/1976 | Kulig | 277/170 X |
| 4,326,724 | 4/1982 | Gernandt | 277/171 X |
| 4,714,008 | 12/1987 | Bowers | 92/258 X |
| 5,071,318 | 12/1991 | Bice et al. | 277/188 A X |

FOREIGN PATENT DOCUMENTS

| | | | |
|---|---|---|---|
| 884586 | 7/1953 | Fed. Rep. of Germany | 277/78 |
| 2361425 | 6/1974 | Fed. Rep. of Germany . | |
| 232422 | 8/1944 | Switzerland . | |
| 284133 | 1/1928 | United Kingdom . | |
| 1357090 | 5/1974 | United Kingdom . | |

*Primary Examiner*—Edward K. Look
*Assistant Examiner*—Hoang Nguyen
*Attorney, Agent, or Firm*—Townsend and Townsend Khourie and Crew

[57] ABSTRACT

The piston (6) guided in a cylinder (1) has at least one split so-called trapped piston ring (10) disposed in an annular groove on the piston. The circumferential face (12) of the ring remote from the inner face (11) of the cylinder bounds in the annular groove a space (23) which is acted upon by the pressure of the gas in the compression space. Starting from this circumferential face (12) the piston ring exhibits two radial boundary areas (13, 14) parallel with one another, of which the area (14) next to the compression space extends over part of the radial width of the ring. The piston ring (10) is guided by its two parallel boundary areas (13, 14) to slide against corresponding areas in the annular groove. The remaining area (16) of the piston ring next to the compression space, starting from the circumferential face (15) next the inner face (11) of the cylinder, forms a wedge face which extends at an angle of from 5° to 15° up to a boundary area parallel with the boundary area (14) next to the compression space. The face in the annular groove adjacent to the wedge face (16) has the same angle and is parallel to the wedge face (16).

15 Claims, 4 Drawing Sheets

PISTON COMPRESSOR FOR THE OILFREE COMPRESSION OF GASES

BACKGROUND OF THE INVENTION

The invention refers to a piston compressor for the oil-free compression of gases, having at least one cylinder and a piston guided in it and provided with at least one split, so-called trapped piston ring which is accommodated in a ring groove on the piston. Its circumferential face remote from the inner face of the cylinder defines a space in the ring groove which is acted upon by the pressure of the gas in the compression space in the cylinder, and which, starting from the circumferential face, has two radial surfaces which are parallel with one another. A face there of next to the compression space extends over part of the radial width of the ring, the piston ring being guided by its two parallel surfaces to slide against corresponding faces of the ring groove.

Such a piston compressor of that kind with trapped piston rings is known from Swiss patent 482 953. Each trapped piston ring has a collar projecting in the axial direction, either only from the side next the compression space so that in cross-section the piston ring has an angular profile, or from both sides of the ring in the axial direction so that a T-shaped cross-section results. As seen in the radial direction the projecting collar is behind a shoulder projecting axially from the annular groove, this shoulder forming a stop for the piston ring when it widens under the pressure from the gas acting on its inner circumferential face. Because of this expansion limitation the piston rings are called trapped rings.

In operation of the piston compressor three phases result for these piston rings:

1. The piston ring is not yet lying with its collar against the shoulder of the annular groove but its outer circumferential area slides against the inner face of the cylinder. The piston ring has a high rate of wear and there is little leakage of gas.

2. The collar of the piston ring reaches the stop face of the projecting shoulder of the annular groove. Wear of the piston ring against the inner face of the cylinder is reduced and the gas leakage is about the same as before.

3. An annular gap forms between the outer circumferential area of the piston ring and the inner face of the cylinder. There is relatively little wear and gas leakage is greater than before. The ring wear which occurred since phase No. 2 and possible further ring wear result from slight transverse piston movements in the cylinder. The better the piston and piston rod are guided, the less wear will occur. When the sealing annular gap between the piston ring and the inner face of the cylinder has become too large, the piston ring must be replaced.

Because of the angular or T-shape of the cross-section of the piston ring, its production is comparatively expensive. Because with the known piston rings the part extending from the projecting collar towards the inner face of the cylinder is bounded by two radial areas parallel with one another, which are guided between parallel areas on the projecting shoulder or shoulders of the annular groove, operation of the compressor in accordance with Phase 3 can lead to so-called fluttering of the rings. This is an uncontrolled motion of the piston ring within its annular groove. One attempts to avoid such fluttering either with gas pressure acting on the inner circumferential area of the piston ring or with tension springs resting against this area. This is, however, only partially successful and the use of tension springs increases costs.

SUMMARY OF THE INVENTION

The problem underlying the invention is to improve the piston compressor of the kind under consideration, in such a way that the operational behavior of the trapped piston ring is optimized and the structural form of the piston ring is simplified to reduce its production costs.

This problem is solved in accordance with the invention by forming a wedged face with an angle of from 5° to 15° beginning at the circumferential face next to the inner face of the cylinder. The wedged face ends where it intersects with a residual area of the piston ring next the compression space. The face of the ring groove in the piston adjacent to the wedge face has the same angle as and is parallel with the wedge face.

Through this design of the piston ring a structurally simple form results which may be inexpensively produced. Furthermore in operation of the compressor during the above-discussed third phase the wedge face generates a clamping action by the piston ring in the annular groove which guarantees a radial location of the piston ring in its stop position and thereby a minimum gap between the outer circumferential area of the piston ring and the inner face of the cylinder. The clamping action also avoids a fluttering of the piston ring in the annular groove. Thus ring wear and gas leakage during the third phase are less than are encountered with known piston rings. This also confers the advantage that the piston rings have a longer life.

German patent 31 48 488 discloses a trapped piston ring in which at the transition to the projecting collar an obtuse rather than a right angle is provided, for reducing the notch effect at the point of transition. A clamping action of the piston ring in its stop position against the projecting shoulder of the annular groove is neither intended nor possible. The part of the piston ring extending from the projecting collar towards the inner face of the cylinder is conventionally bounded by two radial parallel areas. Thus here too a fluttering of the piston ring is not prevented.

The new structural form of the piston ring is particularly advantageous if according to a further development of the invention the piston ring is made of a plastic material having a good dry running property. In this case at high temperatures and gas pressures an extrusion effect known in itself but otherwise undesirable can occur, which consists in the piston ring being deformed in the radial direction. In the case of the piston ring in accordance with the invention the sealing function is hereby improved without the operational safety becoming impaired.

DESCRIPTION OF THE PREFERRED EMBODIMENTS

Figure 1:
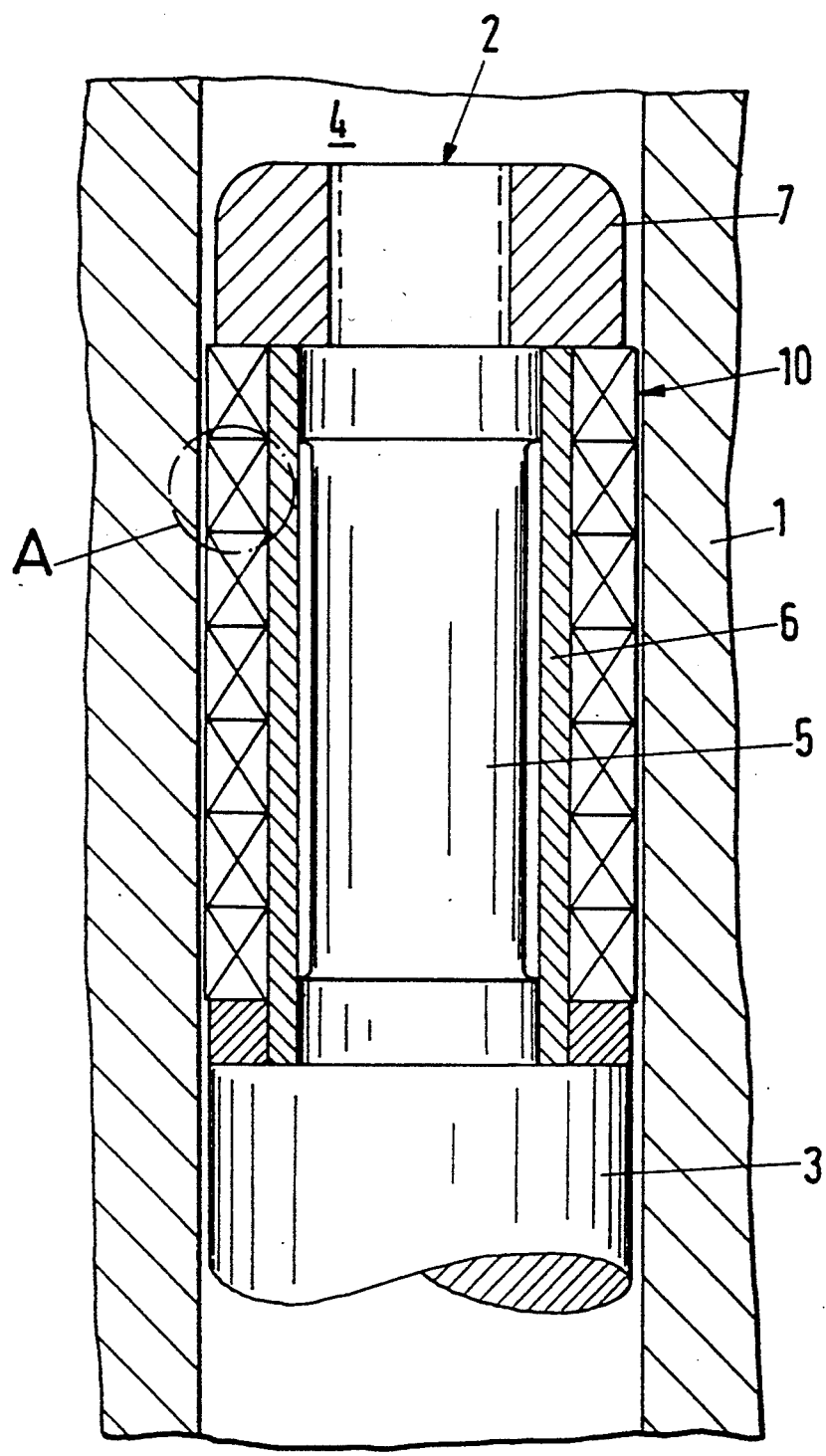
FIG. 1 is a simplified axial section through the piston and the cylinder of a piston compressor constructed according to the invention.

In accordance with FIG. 1 the piston compressor has a cylinder 1 in which a piston 2 is arranged to be movable up and down. The end of the piston at the bottom of FIG. 1 continues into a piston rod 3 which is conventionally connected to a crankshaft (not shown). Above the piston 2 in FIG. 1 is a compression space 4 into which, during the downwards stroke of the piston 2, the gas which is to be compressed is sucked. During the succeeding upwards stroke it is compressed and ejected from the compression space. The piston 2 consists of a rodlike extension 5 from the piston rod 3 surrounded by a sleeve 6 which carries seven trapped piston rings 10 arranged one above the other. The piston rings 10 are held together by a nut 7 screwed onto the upper end of the extension 5.

Figure 2A:
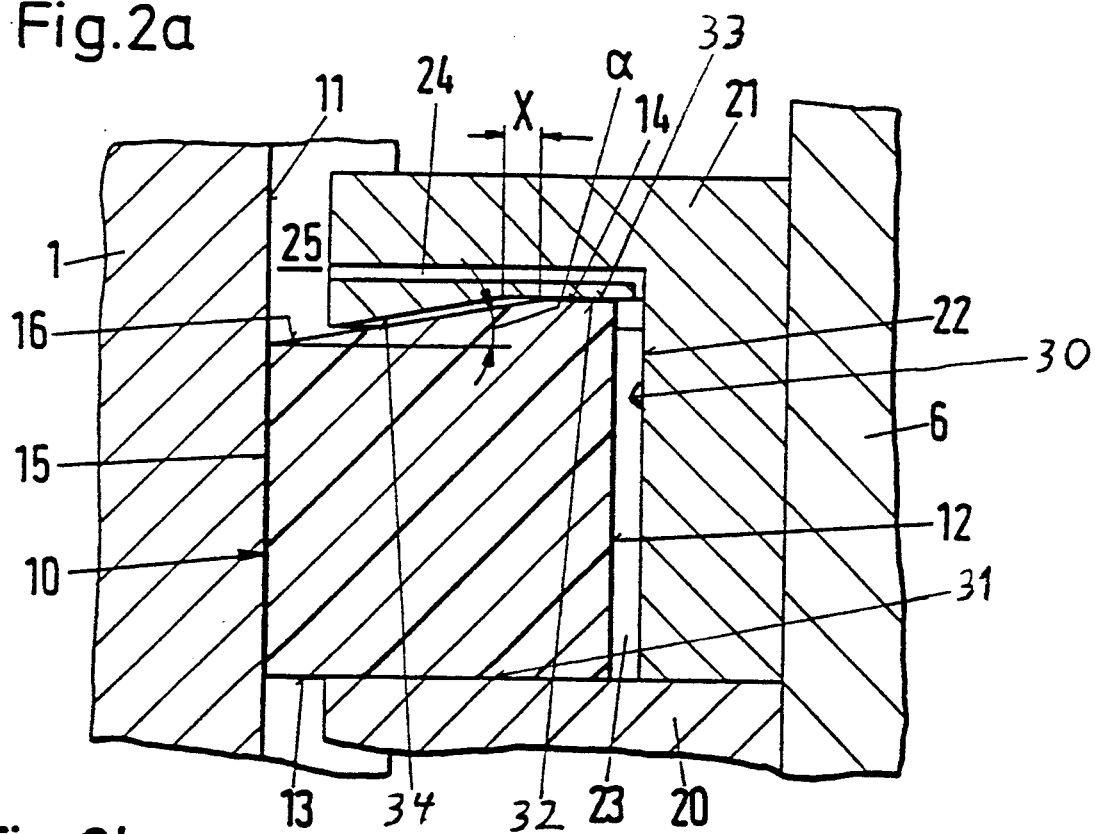
FIG. 2a is an enlarged detail, in section, of the area in FIG. 1 designated "A" in a first operational phase.

In accordance with FIG. 2a the split piston ring 10 is disposed in a ring groove 30 defined by first and second chamber rings 20, 21 and has a cylindrical inner circumferential face 12 remote from the inner face 11 of the cylinder 1. The boundary area 13 of the piston ring at the bottom of FIG. 2a is at a right angle to the inner circumferential face 12 and rests for the greater part against a plane guide face 30 of a chamber ring 20. In parallel with the boundary area 13 the piston ring has at its other end a boundary area 14 which extends over only part of the radial width of the piston ring 10 and rests against a plane guide face 32 of an annular segment 33 of a second chamber ring 21. Between the inner circumferential face 12 and a cylindrical boundary area 22 on the chamber ring 21 is an annular space 23 which opens via a channel 24 into an annular space 25 between the cylinder 1 and the chamber ring 21. In this way the annular space 23 is subject to the gas pressure in the annular space 25 and presses the outer circumferential face 15 of the piston ring against the inner face 11 of cylinder 1.

Between the outer circumferential face 15 and the boundary area 14 of the piston ring 10 at the top of FIG. 2a remains an area 16 which is formed as a wedge face. The wedge face 16 rises at an angle $\alpha = 5°$ to $15°$ to the boundary area 14, $\alpha$ being measured with respect to a line parallel to the boundary area 14. The opposite wedge face 34 in the chamber ring 21 adjacent to the wedge face 16 is inclined at the same angle $\alpha$ but the guide face 32 in the chamber ring for the boundary area 14 is radially outwardly offset relative to boundary area 14 by an amount X. This means that the piston ring 10 can shift outwards in the annular groove formed by the chamber rings 20 and 21 by the amount X as its thickness decreases because of frictional wear against the inner face 11. This state is shown in FIG. 2b.

Figure 2B:
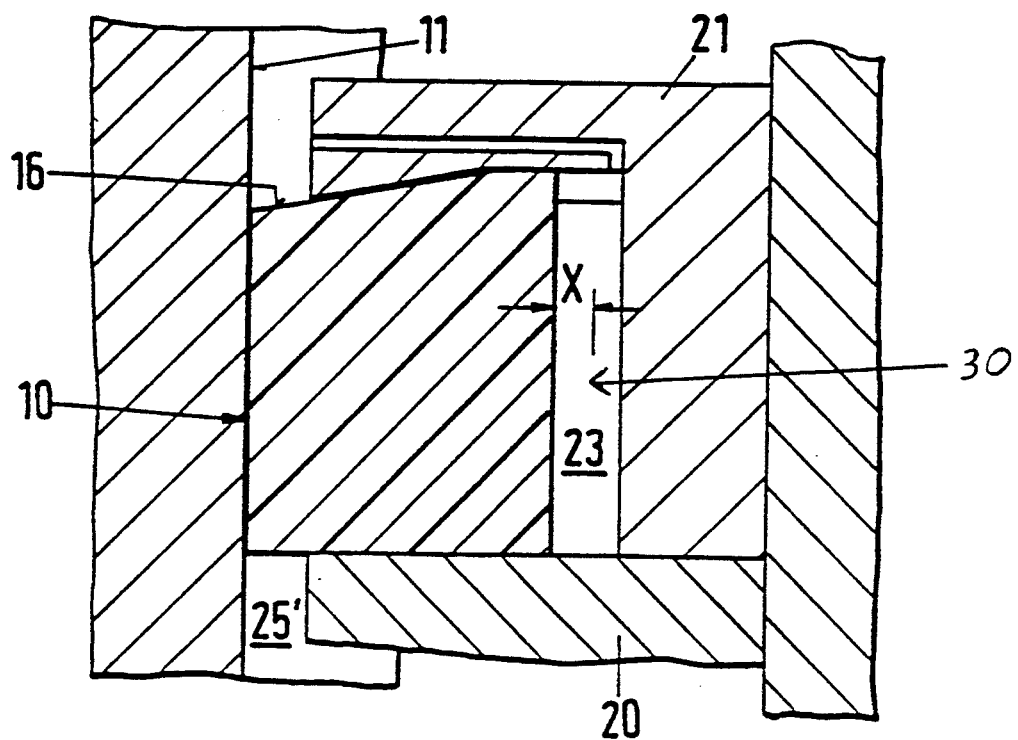
FIG. 2b is a detail similar to FIG. 2a in a second operational phase.

Thus, in accordance with FIG. 2b, the piston ring 10 rests with its wedge face 16 against the opposite wedge face 34 of the chamber ring 21 and hence is impeded from further expansion in the radical direction. Consequently the piston ring is a trapped piston ring. Further wear at the outer circumferential face 15 is only possible if the piston moves radially as it reciprocates in the axial direction. In such a case a narrow annular gap can form between the inner face 11 of the cylinder and the outer circumferential face 15 of the piston ring past which some leaking gas escapes into the next annular space 25' as seen in the direction of the crankshaft. In this case the piston compressor works like one with labyrinth sealing rings.

If dry running plastics or mixtures of plastics (blends) of polytetrafluoroethylene (PTFE), polyetheretherketone (PEEK), polyphenylsulphide (PPS), or polyimide (PI) are employed for the piston rings 10, the possible leakage may be avoided with an extrusion effect. This effect consists in the gas pressure acting of the space 23 deforming the piston ring plastically and thereby in spite of the clamping action against the wedge faces, causing its circumferential face 15 to contact the inner face 11.

Figure 3A:
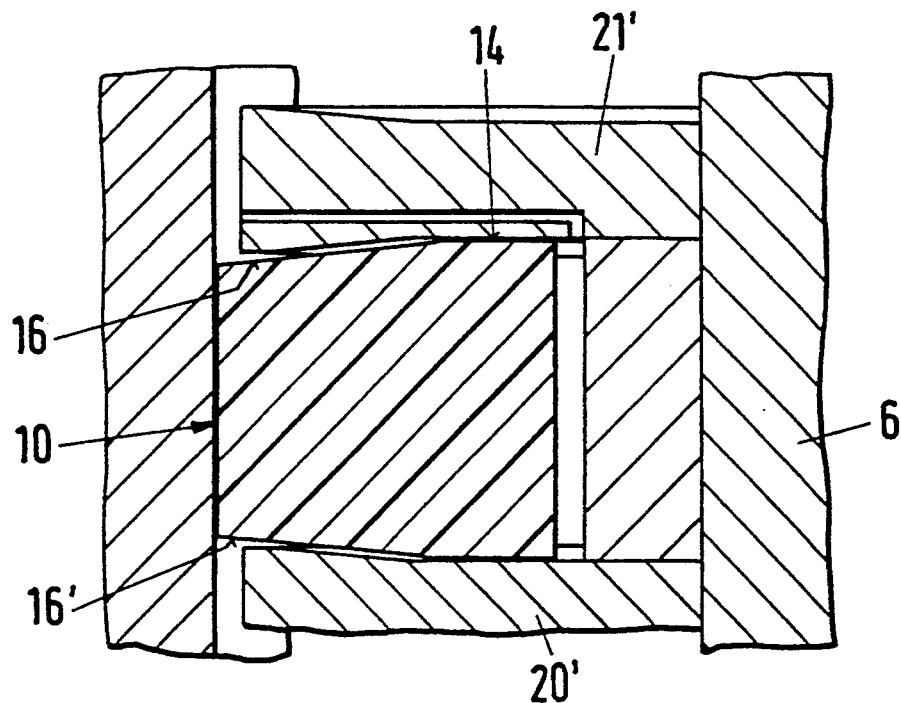
FIGS. 3a and 3b are views corresponding to FIGS. 2a and 2b and illustrate a modified piston ring.
Figure 3B:
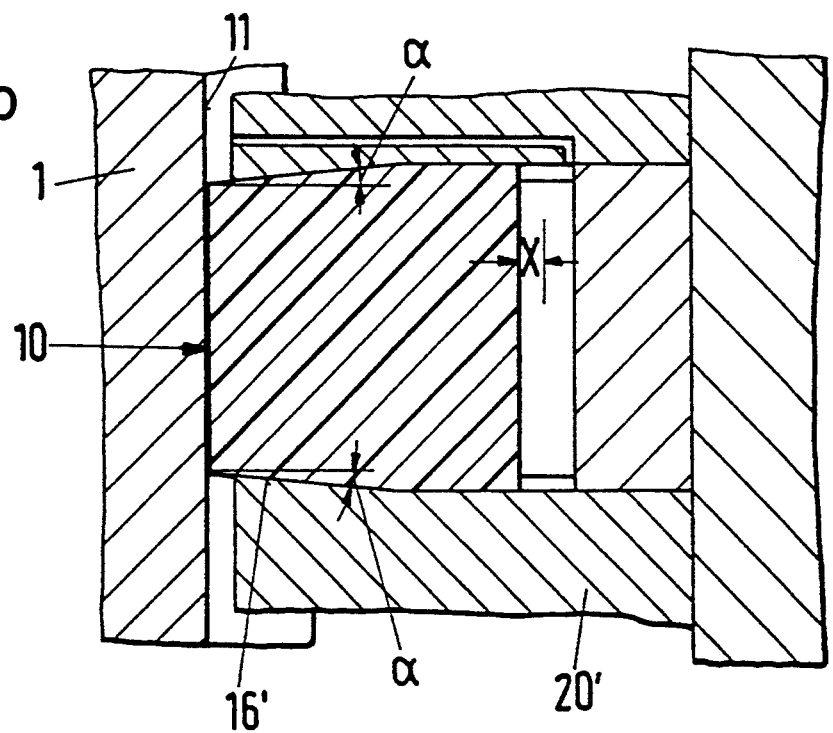

In the embodiment shown in FIGS. 3a and 3b the residual area 16' of the piston ring remote from the compression space is also formed as a wedge face. The area in the chamber ring 20' adjacent to this second wedge face 16' is corresponding wedge-shaped. For production and assembly reasons the chamber rings 20' and 21' are subdivided in the plane of the boundary area 14. This embodiment is intended for compressors in which the piston compresses in two stages, i.e., the piston and the piston rod are made so that there is a compression space at the end of the piston 2 at the bottom in FIG. 1 as well. For the rest, the arrangement of FIGS. 3a and 3b functions in the same way as has been described in connection with FIGS. 2a and 2b.

Figure 4A:
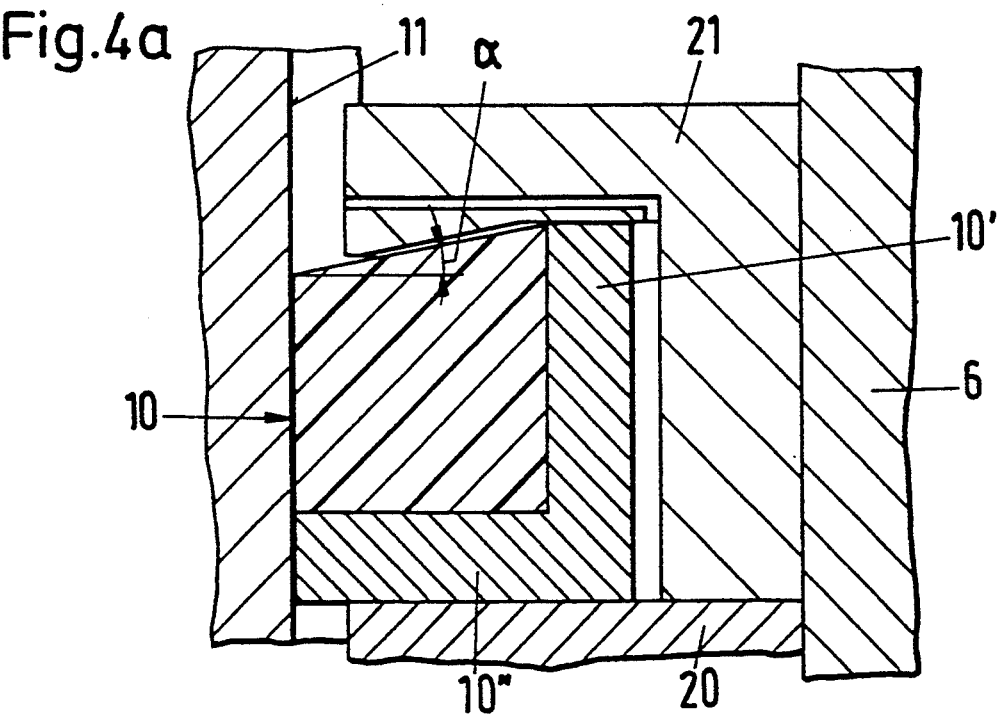
FIGS. 4a and 4b are views corresponding to FIGS. 2a and 2b of a further modified piston ring.
Figure 4B:
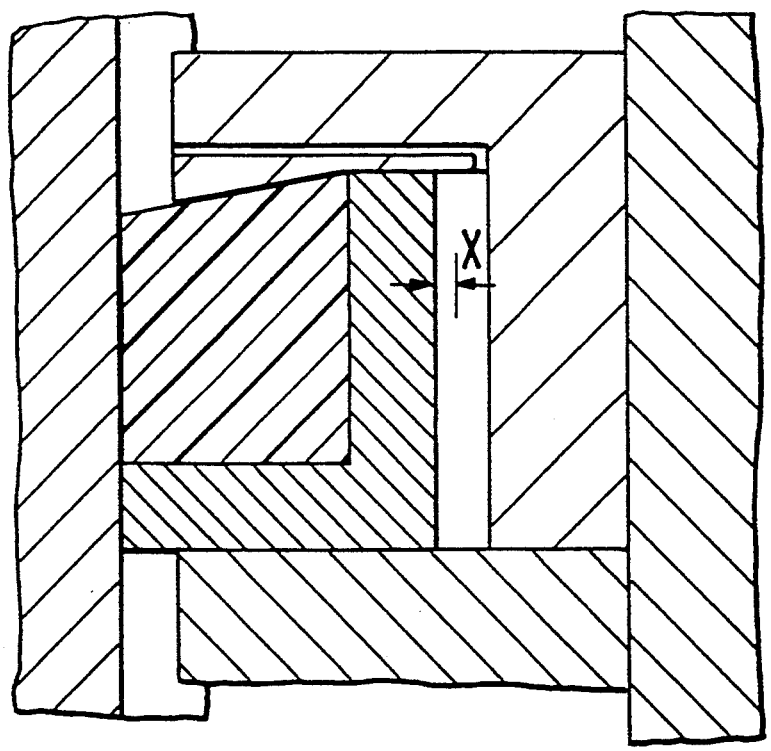

In the embodiment shown in FIGS. 4a and 4b the piston ring 10 consists of two materials of different heat resistance. The part 10' with the cross-section of the piston ring which is remote from the inner face 11 of the cylinder and the part 10'' remote from the compression space form an L-shaped profile which exhibits a higher heat resistance but a less good dry running property than the remaining cross-section of the ring for which a good dry running property is important. In this way the softer part of the piston ring may be supported by the L profile. The chamber rings 20 and 21 are again made as described with respect to FIGS. 2a and 2b. The method of operation is also the same as described with respect to those Figures. The embodiment shown in FIGS. 4a and 4b is used for compressors with extreme combinations of pressure and temperature.

In the examples, the piston rings are described for a piston compressor of crosshead construction; they may also be employed with compressors having plunger piston construction.

What is claimed is:

1. A piston compressor for the oilfree compression of gases comprising a cylinder having an axially extending, inwardly oriented cylinder face and defining a compression space; a piston reciprocally disposed within the cylinder; first and second adjoining chamber rings mounted on the piston terminating short of the cylinder face and forming a radially outwardly open ring groove defined by first and second, axially spaced apart, annular ring groove sides and a radially outwardly facing ring groove base extending axially between the ring groove sides; and a one-piece, split piston ring disposed in the ring groove forming an inner circumferential face opposite to and spaced from the ring groove base, an outer circumferential face in sliding and sealing contact with the cylinder face, and first and second axial end surfaces opposite the first and second ring groove sides, respectively, and extending between the circumferential faces of the piston ring, the end surfaces including parallel surface portions extending from the inner circumferential face towards the outer circumferential face of the piston ring, at least the first end surface further including a wedged surface section extending from a radially outermost end of the surface portion to the outer circumferential face at an angle in the range from 5° to 15° so that an axial thickness of the piston ring at the outer circumferential face is less than an axial thickness of the piston ring at the inner circumferential face; at least the first ring groove side opposite the first end surface of the piston ring including a ring-shaped, tapered surface which is parallel to the wedged surface section; and the first chamber ring defining a passage that extends through the first chamber ring and fluidly couples the compression space with an annular space between the inner circumferential face of the piston ring and the ring groove base to subject the annular space to fluid pressure prevailing in the compression space so that the fluid pressure biases the piston ring radially outwardly to establish sealing contact between the outer circumferential face of the piston ring and the cylinder face.

2. A piston compressor according to claim 1 wherein the first ring groove side with the tapered surface includes an annular segment which is parallel to the surface portion of the first piston ring end surface.

3. A piston compressor according to claim 2 wherein the surface portion of the first piston ring end surface is generally perpendicular to the cylinder face and in sliding contact with the annular segment of the first ring groove side.

4. A piston compressor according to claim 3 wherein a radial extent of the annular segment of the first ring groove side is greater than a radial extent of the first piston ring end surface portion to permit limited radially outward movement of the piston ring as a result of wear on its outer circumferential face when the annular space is pressurized.

5. A piston compressor according to claim 1 wherein the second piston ring end surface is parallel to the first surface portion of the first piston ring end surface over its entire radial extent.

6. A piston compressor according to claim 1 wherein the piston ring is constructed of a plastic material.

7. A piston compressor according to claim 6 wherein the plastic material is selected from the group of plastic materials consisting of polytetrafluoroethylene, polyetheretherketone, polyphenylsulphide and polyimide.

8. A piston compressor according to claim 1 wherein the second end surface also includes a wedged surface section extending from a radially outermost end of its surface portion to the outer circumferential face of the piston ring.

9. A piston compressor according to claim 8 wherein the wedged surface section of the second end surface has an angle relative to the surface portion of the second end surface in the range of between 5° and 15°.

10. A piston compressor for the oilfree compression of gases comprising a cylinder having an axially extending, inwardly oriented cylinder face and defining a compression space; a piston reciprocally disposed within the cylinder; first and second adjoining chamber rings mounted on the piston and forming a radially outwardly open ring groove defined by first and second, axially spaced apart, annular ring groove sides and a radially outwardly facing ring groove base extending axially between the ring groove sides; and a one-piece, split piston ring disposed in the ring groove forming an inner circumferential face opposite to and spaced from the ring groove base, an outer circumferential face in sliding and sealing contact with the cylinder face, and first and second axial end surfaces opposite the first and second ring groove sides, respectively, and extending between the circumferential faces of the piston ring, the end surfaces including parallel surface portions extending from the inner circumferential face towards the outer circumferential face of the piston ring, at least the first end surface further including a wedged surface section extending from a radially outermost end of the surface portion to the outer circumferential face so that an axial thickness of the piston ring at the outer circumferential face is less than an axial thickness of the piston ring at the inner circumferential face; at least the first ring groove side opposite the first end surface of the piston ring including a ring-shaped, tapered surface which is parallel to the wedged surface section; and the first chamber ring defining a conduit that extends through the first chamber ring and fluidly couples the compression space with an annular space between the inner circumferential face of the piston ring and the ring groove base to subject the annular space to fluid pressure prevailing in the compression space so that the fluid pressure biases the piston ring radially outwardly to establish sealing contact between the outer circumferential face of the piston ring and the cylinder face.

11. A piston compressor according to claim 10 wherein the second end surface also includes a wedged surface section extending from a radially outermost end of its surface portion to the outer circumferential face of the piston ring.

12. A piston compressor according to claim 11 wherein an angle between each wedged surface section and the adjoining surface portion is the same.

13. A piston compressor according to claim 10 wherein the chamber rings have an outer periphery which is opposite to and spaced from the cylinder face.

14. A piston compressor according to claim 10 wherein the wedged surface section has an angle with respect to the surface portion of between 5° and 15°.

15. A piston compressor for the oilfree compression of gases comprising a cylinder having an axially extending, inwardly oriented cylinder face and defining a compression space; a piston reciprocally disposed within the cylinder; first and second adjoining chamber rings mounted on the piston terminating short of the cylinder face and forming a radially outwardly open ring groove defined by first and second, axially spaced apart, annular ring groove sides and a radially outwardly facing ring groove base extending axially between the ring groove sides; and a one-piece, split piston ring disposed in the ring groove forming an inner circumferential face opposite to and spaced from the ring groove base, an outer circumferential face in sliding and sealing contact with the cylinder face, and first and second axial end surfaces opposite the first and second ring groove sides, respectively, and extending between the circumferential faces of the piston ring, the end surfaces including parallel surface portions extending from the inner circumferential face towards the outer circumferential face of the piston ring, at least the first end surface further including a wedged surface section extending from a radially outermost end of the surface portion to the outer circumferential face so that an axial thickness of the piston ring at the outer circumferential face is less than an axial thickness of the piston ring at the inner circumferential face; at least the first ring groove side opposite the first end surface of the piston ring including a ring-shaped, tapered surface which is parallel to the wedged surface section; the parallel surface portions of the piston ring being in contact with the ring groove sides of the chamber ring; and the first chamber ring defining a passage fluidly coupling the compression space with an annular space between the inner circumferential face of the piston ring and the ring groove base to subject the annular space to fluid pressure prevailing in the compression space so that the fluid pressure biases the piston ring radially outwardly to establish sealing contact between the outer circumferential face of the piston ring and the cylinder face.

* * * * *